(12) United States Patent
Muller et al.

(10) Patent No.: US 11,577,425 B2
(45) Date of Patent: Feb. 14, 2023

(54) COATER ASSEMBLY FOR A 3D PRINTER

(71) Applicant: ExOne GmbH, Gersthofen (DE)

(72) Inventors: Alexander Muller, Diedorf-Vogelsang (DE); Thomas Leinauer, Diedorf (DE); Thomas Huber, Aichach (DE)

(73) Assignee: ExOne GmbH, Gersthofen (DE)

( * ) Notice: Subject to any disclaimer, the term of this patent is extended or adjusted under 35 U.S.C. 154(b) by 0 days.

(21) Appl. No.: 16/642,512

(22) PCT Filed: Jul. 30, 2018

(86) PCT No.: PCT/EP2018/070620
§ 371 (c)(1),
(2) Date: Feb. 27, 2020

(87) PCT Pub. No.: WO2019/042681
PCT Pub. Date: Mar. 7, 2019

(65) Prior Publication Data
US 2020/0189144 A1 Jun. 18, 2020

(30) Foreign Application Priority Data

Sep. 1, 2017 (DE) .................... 10 2017 120 205.6

(51) Int. Cl.
*B33Y 30/00* (2015.01)
*B28B 1/00* (2006.01)

(52) U.S. Cl.
CPC .............. *B28B 1/001* (2013.01); *B33Y 30/00* (2014.12)

(58) Field of Classification Search
CPC ... B29C 64/165; B29C 64/321; B29C 64/329; B29C 64/153; B05C 19/06; B05C 19/04; B28B 1/001
See application file for complete search history.

(56) References Cited

U.S. PATENT DOCUMENTS

2013/0000553 A1   1/2013  Hoechsmann et al.
2013/0004607 A1   1/2013  Hoechsmann et al.
(Continued)

FOREIGN PATENT DOCUMENTS

CN    106696260 A    5/2017
CN    209903948 U    1/2020
(Continued)

OTHER PUBLICATIONS

International Search Report issued for the corresponding international patent application No. PCT/EP2018/070620, dated Nov. 22, 2018, 3 pages (for informational purposes only).
(Continued)

*Primary Examiner* — Joseph S Del Sole
*Assistant Examiner* — Mohamed K Ahmed Ali
(74) *Attorney, Agent, or Firm* — Viering, Jentschura & Partner MBB (57) ABSTRACT

Disclosed is a coater assembly 1 for a 3D printer, comprising a coater 3 having a container 5 which defines an inner cavity for receiving particulate construction material which opens into a container opening 7 for outputting the particulate construction material from the container 5, and an output region 9 which defines a coater output opening 11 for outputting the particulate construction material from the coater 3 onto a construction field. The container 5 is movable relative to the coater output opening 11 so that by moving the container 5 relative to the coater output opening a discharge of particulate construction material from the inner cavity through the container opening 7 and the coater output opening 11 onto the construction field is variable.

17 Claims, 4 Drawing Sheets

(56) References Cited

U.S. PATENT DOCUMENTS

| | | | |
|---|---|---|---|
| 2013/0186514 A1 | 7/2013 | Zhuang et al. | |
| 2016/0311164 A1 | 10/2016 | Miyano | |
| 2016/0368215 A1* | 12/2016 | Miyano | B29C 64/218 |
| 2017/0050270 A1 | 2/2017 | Miyano et al. | |
| 2017/0341302 A1* | 11/2017 | Hochsmann | B22F 12/00 |
| 2017/0341303 A1 | 11/2017 | Höchsmann et al. | |
| 2017/0361500 A1 | 12/2017 | Höchsmann et al. | |
| 2018/0079133 A1 | 3/2018 | Ederer et al. | |

FOREIGN PATENT DOCUMENTS

| | | | | |
|---|---|---|---|---|
| DE | 102009056687 A1 | 6/2011 | | |
| DE | 102009056689 A1 | 6/2011 | | |
| DE | 102009056696 A1 | 6/2011 | | |
| DE | 102014112454 A1 | 3/2016 | | |
| DE | 102015003372 A1 | 9/2016 | | |
| EP | 3085517 A1 | 10/2016 | | |
| EP | 3098064 A1 | 11/2016 | | |
| WO | 2016030375 A2 | 3/2016 | | |
| WO | WO-2016030417 A1 * | 3/2016 | | B29C 64/205 |
| WO | 2016135974 A1 | 9/2016 | | |
| WO | 2016135975 A1 | 9/2016 | | |
| WO | 2016151783 A1 | 9/2016 | | |

OTHER PUBLICATIONS

Search Report by Registered Search Organization issued for the corresponding Japanese patent application No. 2020-511896, dated Mar. 8, 2021, 11 pages (for informational purposes only).

* cited by examiner

COATER ASSEMBLY FOR A 3D PRINTER

The present invention concerns a coater assembly for a 3D printer and a 3D printer with such a coater assembly. In particular, the present invention relates to a coater assembly according to the preamble of claim 1. Such a coater assembly is known, for example, from DE 10 2014 112 454 A1.

Various generative manufacturing processes (and consequently various types of 3D printers, i.e. machines/constructions for building up a component in layers) are known.

DE 10 2015 003 372 A1 discloses a method and a device for manufacturing 3D formed parts by means of a layer building technique, wherein a recoater is used which is able to coat in both directions of travel.

Some generative manufacturing processes have the following steps in common:

(1) First, particulate material (and/or particulate construction material) is applied over the entire surface of/continuously on a construction field, so as to form a layer of unsolidified particulate material.

(2) The applied layer of unsolidified particulate material is selectively solidified in a predetermined partial area (in accordance with the component part to be manufactured), for example by selectively printing a treatment agent, for example a binder (alternatively, for example, by laser sintering).

(3) Steps (1) and (2) are repeated to manufacture a desired component. For this purpose, a construction platform on which the component is built up in layers may, for example, be lowered by respectively one layer thickness before a new layer is applied (alternatively, the coater and the printing device may, for example, be raised by respectively one layer thickness).

(4) Finally, the manufactured component which is formed by the solidified partial areas and is supported and surrounded by loose, unsolidified particulate material may be unpacked.

The construction space in which the component or the components is/are manufactured may, for example, be defined or formed by a so-called construction box (also referred to as "job box"). A construction box of this type may have a circumferential wall structure which is open in an upward direction and extends in a vertical direction (for example formed by four vertical side walls), which may, for example, be formed to be rectangular when viewed from above. A height-adjustable construction platform may be received in the construction box. In this respect, the space above the construction platform and between the vertical circumferential wall structure may for example at least contribute to forming the construction space. An example of such a construction box is, for example, described in DE 10 2009 056 696 A1. However, the construction space may, for example, also be free at the side, i.e. unlimited at the circumference. An upper area of the construction space may, for example, be referred to as a construction field.

A coater (also referred to as a "recoater") is normally used in the above step (1). Various coaters are known for use in 3D printers, by means of which a particulate construction material may be applied to the construction field (also referred to as construction surface or construction area) in the form of a uniform layer over the entire surface/a continuous layer.

One type of coater uses a roller (short: "roller coater") in front of which first an amount of particulate construction material is put down and which is then horizontally moved across the construction field to apply the particulate construction material in the form of a uniform layer onto the construction field. In this respect, the roller may be rotated opposite to the moving direction. Coater assemblies with great lengths (and consequently 3D printers with large dimensions) are difficult to realize using a roller coater, amongst others due to a possible deflection of the roller.

Another kind of coater (a so-called "container coater", for example a "slot coater") uses a container which defines an inner cavity for receiving particulate material, and has an output region (for example an elongated output region), for example comprising an (for example elongate) output slot, for outputting the particulate construction material. The container coater may, for example, be displaceable across a construction field (for example horizontally, for example transverse to its longitudinal direction), wherein the particulate material can be output onto the construction field through the (elongate) output region to thereby apply a uniform/continuous construction material layer over the entire surface of the construction field. The coater may be elongate, for example, to span and/or to cover the length or width of a rectangular construction field. Coater assemblies with great length (and consequently 3D printers with large dimensions) can be realized well using a container coater.

In the above step (2), a printing device having a print head may for example be used, which applies a treatment agent in a controlled way onto a partial area of the construction material layer applied before. The treatment agent contributes to a (direct and/or later) solidification of the particulate material layer in the partial area. For example, the treatment agent may be/contain a binder, for example a binder component of a multicomponent binder.

Alternatively, a laser may, for example, be used in the above step (2) to solidify a partial area of the construction material layer applied previously, in particular by sintering or melting the construction material in the partial area.

The present invention relates to a coater assembly of the latter type, short: a coater assembly with a "container coater", for example a "slot coater".

Coating devices of this type may, for example, be provided with a vibration device by means of which the particulate material may be vibrated to influence, in particular to support, the flow and/or trickle behavior of the particulate construction material and/or the discharge of the particulate construction material from the output region. A vibration device of this type may, for example, be formed by a shaking device by means of which a wall portion of the container may be vibrated and/or rather exposed to a shaking motion to influence the discharge of the particulate construction material.

In addition, coater assemblies of this type may, for example, be provided with a stroking/sweeping member by which construction material applied to the construction field may be stroked, to thereby compress and/or level the construction material. The stroking/sweeping member may, for example, be arranged adjacent to a/the output slot and/or may delimit the same at least in part, and may, for example, form the so-called output region of the coater together with the output slot.

An example of a coater assembly including a "slot coater" is known from DE 10 2009 056 689 A1. See therein, for example, FIGS. 17 to 20.

Another example of a "slot coater" is known from WO 2016/030417 A1 and WO 2016/030375 A2 which both describe a so-called bidirectional coater. See for example FIGS. 2, 4, 5, 6, 7 of WO 2016/030417 A1.

It is, in addition, known to clean the container lower side with a coater cleaning device. A suitable coater cleaning device is, for example, known from DE 10 2009 056 687 A1. See therein, for example, FIG. 21.

Furthermore, it is known from initially mentioned DE 10 2014 112 454 A1 to provide the coater assembly with a closing device which is configured to selectively close an opening of the coater for outputting the particulate construction material onto a construction field. This can bring about various advantages, some of which are described in DE 10 2014 112 454 A1, to which reference is made in this respect and the disclosure content of which is in this respect incorporated by reference herein.

The closing device described in DE 10 2014 112 454 A1 comprises a first and a second elongated hollow body, each of the two hollow bodies having an inner cavity delimited by a deformable portion, the two hollow bodies being arranged on opposite sides of the output opening of the coater (in a coater transverse direction), in a way that the deformable portions face each other, and the deformable portions being configured to be deformed in an outward direction by a pressure fluid supplied to the associated hollow body, thereby expanding the inner cavity, so that the two deformable portions are movable towards each other and can be brought into contact with each other, to thereby close the opening.

It may be considered as being an object of the present invention to provide an alternative or improved coater assembly for a 3D printer of the "container coater" type.

The present invention provides a coater assembly for a 3D printer according to claim 1 and a 3D printer including such a coater assembly according to claim 17. Further embodiments of the coater assembly are described in dependent claims 2-16.

According to various embodiments, a coater assembly for a 3D printer may comprise a coater comprising a container which defines an inner cavity for receiving particulate construction material, which opens into a container opening for outputting the particulate construction material from the container, and an output region which defines a coater output opening for outputting the particulate construction material from the coater onto a construction field. The container is movable (for example pivotable) relative to the coater output opening, so that, by moving (for example pivotably moving, for example pivoting) the container relative to the coater output opening, a discharge of particulate construction material from the inner cavity through the container opening and the coater output opening onto the construction field is variable.

Within the meaning of the present invention, varying the discharge may, on the one hand, be understood to mean that, for example, by moving the container relative to the coater output opening, the discharge of particulate construction material can be dosed, i.e. can be adjusted as to its quantity. In other words, as a result of the movement of the container, different quantities (for example two or more) of particulate construction material may be output, wherein the respective quantity is greater than "zero". In this respect, a respective quantity can be assigned a different position of the container.

Within the meaning of the present invention, varying the discharge may, on the other hand, be understood to mean that, for example, by moving the container relative to the coater output opening, the discharge of particulate construction material can be suppressed, i.e. the coater can be selectively closed. In other words, different quantities (for example two or more) of particulate construction material can be output as a result of moving the container, one of the quantities being "zero".

It should be understood that the two possibilities described above may be implemented alternatively or together. In the latter case, three or more different quantities may be output, one of which being "zero".

The discharge of particulate construction material may, for example, be expressed in the form of a mass flow or volume flow of construction material discharged from the coater output opening.

The claimed coater assembly therefore comprises a coater output opening and a container opening which communicate with each other for the purpose of outputting particulate construction material and whose communication is selectively adjustable by moving (for example pivotably moving, for example pivoting) the container relative to the coater output opening.

Since adjusting the communication and/or varying the discharge is effected by moving the container relative to the coater output opening, the coater can be constructed in a compact and relatively simple way. For example, an additional closing member and/or an additional dosing member can be saved. Thus, a coater assembly for a 3D printer may be provided which is formed to be compact and/or less complex than the coater assembly described in DE 10 2014 112 454 A1.

If the movement of the container relative to the coater output opening allows the discharge to be dosed, the manageability and application possibilities of the coater assembly can be improved.

If the movement of the container relative to the coater output opening allows the discharge to be suppressed, an alternative coater assembly to the coater assembly described in DE 10 2014 112 454 A1 can be provided for a 3D printer, which allows the coater to be selectively closed.

According to various embodiments, for example, for suppressing the discharge and/or closing the coater by moving the container relative to the coater output opening, the container opening may be movable away from the coater output opening in such a way that (for example by a lateral movement component) construction material discharged/trickling out of the container opening runs out by itself before it reaches the coater output opening, i.e. forms a cone of bulk material which does not extend as far as the coater output opening.

According to various embodiments, for example, for suppressing the discharge and/or closing the coater by moving the container relative to the coater output opening, the container opening may be movable away from the coater output opening in such a way that, in a plan view or in a bottom view of the coater, there is no overlap between the two openings.

According to various embodiments, for example, for outputting construction material, i.e. adjusting a quantity of greater than "zero", by moving the container relative to the coater output opening, the container opening and the coater output opening may be aligned with each other, for example in such a way that they are completely or substantially flush with each other, and/or the container opening and the coater output opening are positioned to overlap each other in a plan view or a bottom view of the coater.

According to various embodiments, for example, for dosing the discharge, by moving the container relative to the coater output opening, a degree of overlap of the container opening and the coater output opening may be selectively adjustable and/or changeable in a plan view or a bottom view of the coater.

According to various embodiments, for example, the container opening may be arranged above the coater output opening and/or the container opening may be provided at a lower portion of the container and/or the container may be elongated and/or the container opening may have an elongated slot shape and/or a longitudinal axis of the container opening and/or of the slot may extend in a horizontal direction perpendicular to a direction in which the coater is displaceable (see below) and/or the coater output opening may have an elongated slot shape and/or a longitudinal axis of the coater output opening or slot may extend in a horizontal direction perpendicular to a direction in which the coater is displaceable and/or the container opening and the coater output opening may have substantially the same length and/or substantially the same width, and/or the coater output opening may be oriented downwardly and/or may be oriented toward the construction field.

According to various embodiments, the container may, for example, be pivotable relative to the coater output opening. This is one way of moving the container relative to the coater output opening, which has been proven in practice. Another possibility would be, for example, a linear movement of the container relative to the coater output opening, for example a horizontal, linear movement. The pivoting movement takes place, for example, about its own pivot axis, i.e., in the form of a self-rotation. The pivot axis may be arranged within the container and/or parallel to the longitudinal axis thereof. The coater assembly may have a corresponding (first) pivot drive by which the container is pivotable relative to the coater output opening. The coater assembly may comprise a control device that communicates with the (first) pivot drive. The container opening may thus be moved on a circular path and/or along a circular arc as a result of the movement of the container.

According to various embodiments, the output region may, for example, comprise at least one stroking/sweeping member configured to stroke construction material output from the coater output opening, to thereby level and/or compress the output particulate material, the container being movable relative to the at least one stroking/sweeping member. The at least one stroking/sweeping member may be arranged in a transverse direction on one side of the coater output opening and may delimit the coater output opening, for example, on this side. For example, two stroking/sweeping members may be provided on sides opposite in a transverse direction (for example, in the case of a bidirectional coater) and may delimit the coater output opening, for example, in a transverse direction on the opposite sides. For example, the at least one stroking/sweeping member may be elongated and/or formed to be strip-shaped and/or made of ceramic or metal (for example steel) and/or may have a planar stroking/sweeping surface oriented downwards and/or facing the construction field. The (respective) stroking/sweeping member may, for example, be configured in the form of a so-called stroking bar/strip and/or stroking blade. Two stroking/sweeping members may, for example, be arranged parallel to each other.

According to various embodiments, the coater may also, for example, comprise a support structure to which the at least one stroking/sweeping member is attached, for example rigidly attached. The stroking/sweeping member may, for example, be attached to the support structure separately from the container and/or in a manner to be shaking motion-decoupled with respect to the container. The stroking/sweeping member may, for example, also be formed by the support structure itself, for example by a lower portion thereof.

The support structure may, for example, be elongated and may, for example, extend in a horizontal direction perpendicular to a direction in which the coater is displaceable (see below). For example, the support structure may comprise one or more carriers extending with their longitudinal axis in the horizontal direction perpendicular to the direction in which the coater is displaceable. For example, two carriers may be arranged parallel to each other.

According to various embodiments, the coater assembly may, for example, further comprise, a bearing block to which the support structure is pivotably attached so that the support structure and the at least one stroking/sweeping member attached thereto are pivotable relative to the bearing block to adjust a (work) angle of the at least one stroking/sweeping member (for example, an angle between a stroking/sweeping surface of the stroking/sweeping member and an imaginary horizontal line or an angle between the stroking/sweeping surface of the stroking/sweeping member and the construction field). The coater assembly may comprise a corresponding (second) pivot drive by which the support structure including the stroking/sweeping member(s) may be pivotable relative to the bearing block. The coater assembly may comprise a control device that communicates with the (second) pivot drive. For example, two bearing blocks may be provided between which the support structure is supported in a longitudinal direction.

According to various embodiments, the container may, for example, be pivotably attached to the support structure.

According to various embodiments, the coater assembly may, for example, also comprise a guide structure and a (third) drive by which the coater is displaceable across the construction field, for example horizontally and/or linearly. For this purpose, for example, the bearing block described above may be attached to the guide structure, for example to a guide carriage of the guide structure. The coater assembly may comprise a control device that communicates with the (third) drive.

According to various embodiments, the coater assembly may, for example, comprise a vibration device, for example comprising a vibration drive, by means of which particulate construction material received in the container may be vibrated. This may influence the flow and/or trickle behavior of the particulate construction material and/or the discharge of the particulate construction material from the output region. The coater assembly may comprise a control device that communicates with the vibration drive.

According to various embodiments, the container may be elongated, wherein, for example, the vibration drive may be provided at a first longitudinal end of the container and a drive for moving the container relative to the coater output opening (for example the above first pivot drive) may be provided at a second longitudinal end of the container.

According to various embodiments, the container may, for example, be pivotable about a pivot axis relative to the coater output opening, wherein the vibration drive, for example, excites the pivot axis of the container in an axial direction, for example moves it in a "shaking" way in an axial direction or "reciprocates" it in an axial direction. By the excitation of the pivot axis, the flow and/or trickle behavior of the particulate construction material and/or the discharge of the particulate construction material from the output region can be influenced in a simple and compact way. A (direct) shaking at the wall portions of the container is not necessary.

According to various embodiments, for example,
an outer wall of the container may have a downwardly tapering shape in cross-section and/or
an outer wall of the container may have a circular arc shape in cross-section and/or an outer wall of the container may have a trough shape in cross-section, and/or the container may be formed to be open in an upward direction, and/or the container may be configured to be elongated, wherein the longitudinal axis extends, for example, in the horizontal direction which is perpendicular to the direction in which the coater is displaceable.

According to various embodiments, the container may, for example, be elongated, wherein, for example, one or more transverse ridges are provided in the longitudinal direction of the container. The transverse ridges may connect outer wall portions of the container opposite in the transverse direction. This may help improve a transmission of the vibration to the particulate material.

According to various embodiments, the coater may, for example, also comprise a storage container configured to feed the container with particulate construction material, the container being movable relative to the storage container, for example. The storage container may, for example, be placed above the container and/or may be rigidly attached to the support structure and/or incorporate a distribution device such as a distributing worm and/or may be open in an upward direction so as to be able to be filled with fresh construction material in a filling station (for example comprising a feeding unit) of the 3D printer itself.

According to various embodiments, for example, the coater assembly can further comprise a control unit which is configured to move the container relative to the coater output opening by means of a drive (for example, by means of the above, first pivot drive) in order to thereby vary the discharge of particulate construction material. The control unit may, for example, comprise the control device of the first pivot drive and/or the control device of the second pivot drive and/or the control device of the third drive and/or the control device of the vibration drive.

According to various embodiments, for example, a 3D printer may be provided which comprises a coater assembly as described above.

For example, the 3D printer may further comprise:

a printing device for selectively outputting treatment agent in a controlled way, configured to print treatment agent on predetermined areas of a previously applied layer of construction material (the treatment agent output by means of the printing device contributes to a selective solidification and may, for example, be a binder component of a multicomponent binder, another binder component being contained in or added to the construction material); and/or a feeding unit integrated into the 3D printer, which allows construction material to be freshly prepared and to be fed into the coater, and/or one or more construction platforms and/or construction boxes, which define a respective construction field.

The printing device may, for example, be movable horizontally, for example in a direction perpendicular to the direction in which the at least one coater is movable. The printing device may, for example, be configured to serve several construction fields. The printing device may, for example, be additionally movable in the direction in which the at least one coater is movable as well, so that it may travel across the construction field or the construction fields in a meandering course, for example in the shape of a U.

Alternatively, a respective construction material layer may, for example, be solidified selectively, for example sintered, using a laser (so-called "selective laser sintering").

The at least one construction box may, for example, receive a height-adjustable construction platform which is lowered progressively during the generative manufacturing process (and/or during a so-called "construction job"). The drive for the height adjustment may, for example, be provided either directly into the construction box ("riding along") or, for example, to be stationary ("installation/plant-fixed") in the 3D printer. The construction box may, for example, be movable out of and into the 3D printer, for example via a roller conveyor and/or via its own travel drive integrated into the construction box. The construction box may, for example, be configured as described above, for example as described in DE 10 2009 056 696 A1.

Within the meaning of this invention, particulate construction material may be understood to mean a construction material which contains at least one type of particulate material (for example (grains of) sand, for example foundry sand, and/or metal particles and/or particles of synthetic material). Various types of particulate material may be included in the construction material as well, such as a mixture of new sand and recycled sand or a mixture of fine sand and coarse sand or a mixture of two different types of sand. Moreover, the construction material may comprise at least one liquid component, for example a binder component, for example an activator, and/or one or more solid and/or liquid additives. In case that the construction material contains a binder component, another binder component, such as furan resin, may selectively be printed onto a previously applied construction material layer by means of a printing device, so as to solidify this layer in a predetermined area. Depending on the component to be manufactured, for example a casting mold or a foundry core, a construction material composition specifically prepared for this purpose may be used. In this respect, the construction material composition may be defined by the number of components used as well as by the respective type and the respective share of components contained in the construction material (mixture). In this respect, the trickle and/or flow behavior of the construction material may vary depending on the construction material composition.

Exemplary but non-limiting embodiments of the invention are shown in the Figures and are hereinafter described in detail.

In the following detailed description, reference is made to the enclosed Figures which are incorporated therein and in which specific embodiments are shown by way of illustration, according to which the invention can be performed. In this respect, the terms referring to the directions "up", "down", "front", "rear", etc. are used with reference to the orientation in the described Figure(s). As components of embodiments may be positioned in a number of different orientations, the terminology indicating the different directions serves for illustration and shall not be restrictive in any way.

It shall be understood that other embodiments may be used and structural or logical changes may be made without deviating from the scope of protection of the present invention. It shall be understood that the features of the various exemplary embodiments described herein may be combined unless specified otherwise. Thus, the following detailed description should not be understood in a restrictive sense and the scope of protection of the invention shall be defined by the attached claims.

In this description, terms such as "connected", "attached" or "coupled" may be used to describe both a direct and indirect connection, a direct or indirect attachment and a direct or indirect coupling.

In the Figures, identical or similar members are provided with identical reference numbers where appropriate.

Figures 1, 2:
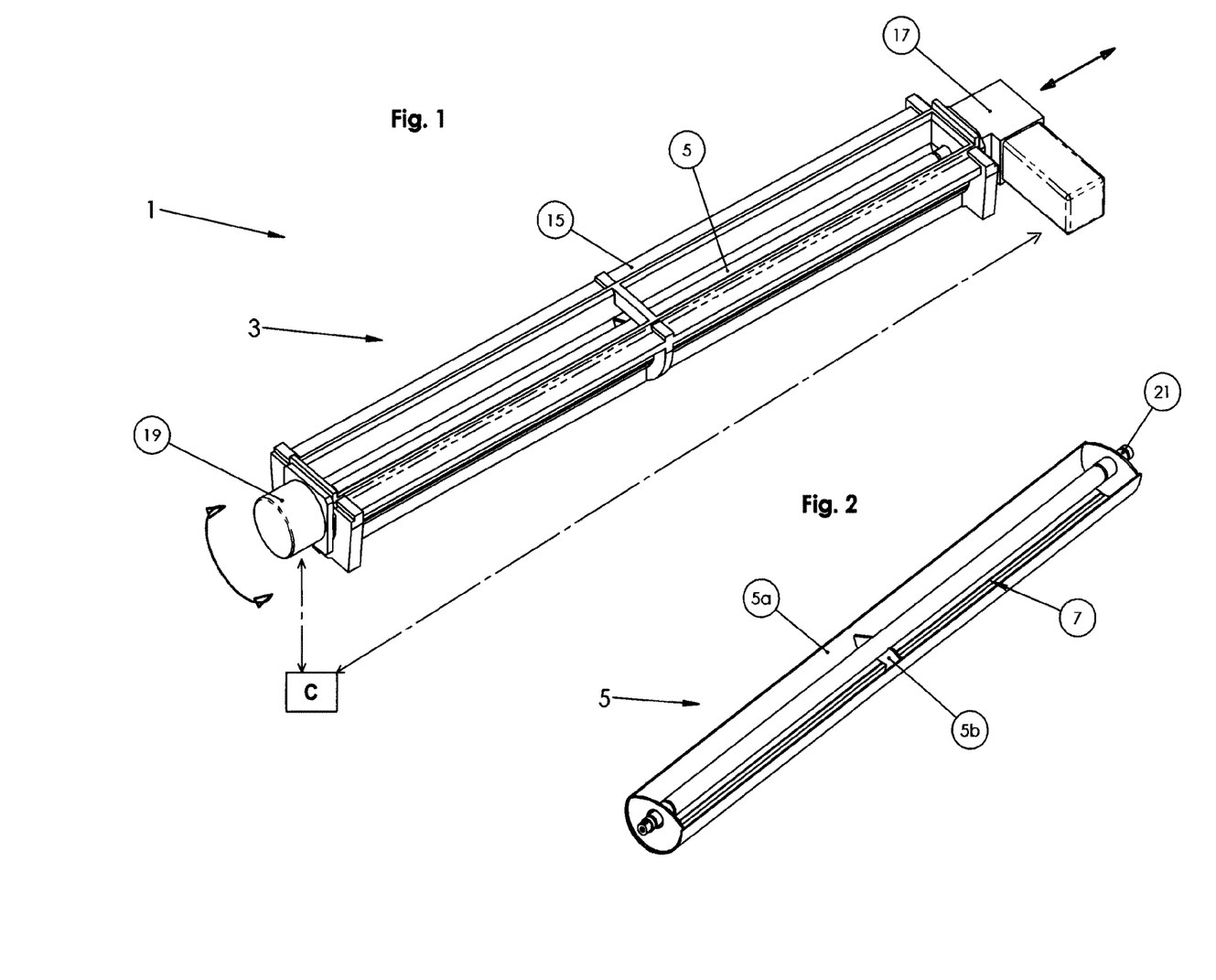
FIG. 1 shows a perspective view of a coater assembly according to a first embodiment of the invention.
FIG. 2 shows a perspective view of the (isolated) container of the coater assembly according to FIG. 1.
Figure 3A:
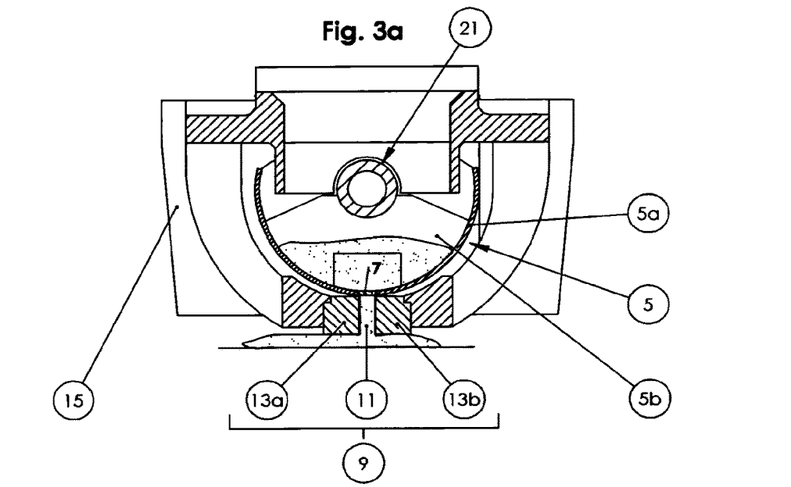
FIGS. 3(a) to 3(c) show various cross-sectional views of the coater assembly of FIG. 1, FIG. 3(a) showing an open/released coater output opening, FIG. 3(c) showing a closed coater output opening, and FIG. 3(b) showing a dosing of particulate construction material from the coater output opening.
Figure 3B:
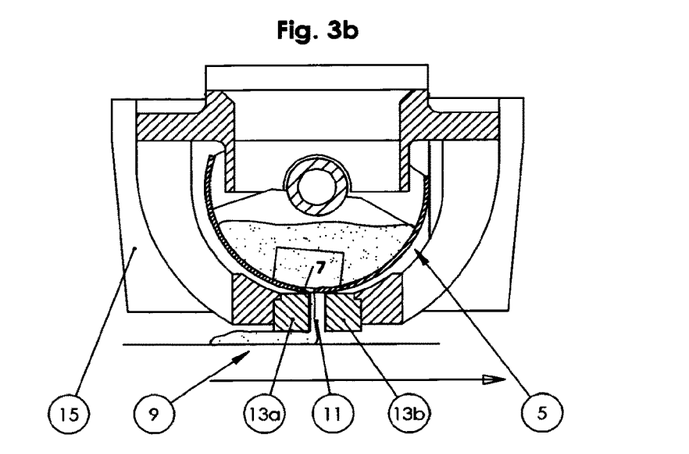
Figure 3C:
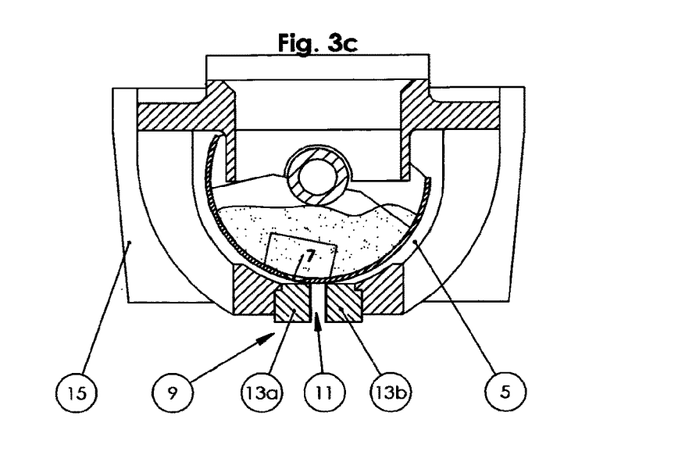

FIGS. 1 to 3 show a coater assembly 1 according to a first embodiment of the invention. The coater assembly 1 may be used in a 3D printer and may comprise a coater 3 including a container 5 which defines an inner cavity for receiving particulate construction material, which opens into a container opening 7 for outputting the particulate construction material from the container, and an output region 9 which defines a coater output opening 11 for outputting the particulate construction material from the coater onto a construction field. The container 5 is movable relative to the coater output opening 11 so that, by moving the container relative to the coater output opening, a discharge of particulate construction material from the inner cavity through the container opening and the coater output opening onto the construction field is variable. The latter is particularly evident from a comparison of FIGS. 3a) to 3c). In FIGS. 3a) to 3c) the construction field is indicated as a horizontal line. The arrow pointing to the right in FIG. 3b) indicates the coating direction and/or the direction of travel of the coater.

As indicated in FIG. 3b), by moving the container relative to the coater output opening (here, by way of example, by pivoting the container), the discharge of particulate construction material may be dosed, i.e. may be adjusted as to quantity. It goes without saying that other "dosing settings" of the container are conceivable and/or adjustable, in which another, dosed quantity can be dispensed.

As indicated in FIG. 3c), the discharge of particulate construction material may also be suppressed and/or the coater may be closed selectively by moving the container relative to the coater output opening.

As indicated in FIG. 3a), moving the container relative to the coater output opening also allows the discharge of particulate material to be maximized by aligning the coater output opening 11 and the container opening 7 with respect to each other in a way to be completely flush with respect to each other.

The coater output opening 11 and the container opening 7 thus communicate with each other for the purpose of outputting particulate construction material, and a degree of communication and/or a communication path between the two openings is selectively adjustable by moving the container relative to the coater output opening.

In FIG. 3c, the container 5 is pivoted relative to the coater output opening 11 and/or away from coater output opening 11 into a position where construction material discharged from/trickling out of the container opening 7 will run out by itself before it reaches the coater output opening 11, i.e. trickling construction material will form a cone of bulk material which will stop in front of the coater output opening.

In the container position shown in FIG. 3c, there is no overlap between the two openings 7, 11 in a top or bottom view of the coater. In contrast, in FIGS. 3a and 3b, in a top or bottom view of the coater, the container opening 7 and the coater output opening 11 each overlap with each other, with a degree of overlap being at a maximum level in FIG. 3a) and greater than that in FIG. 3b). In this respect, FIG. 3a) shows a complete alignment of the two openings. Other degrees of overlap/overlap patterns are conceivable and/or adjustable.

As shown in FIGS. 3a) to 3c), the container opening 7 is located above the coater output opening 11 and is provided at a lower portion of the container 5.

As shown in FIG. 2, the container 5 is elongated and the container opening 7 has an elongated slot shape. The longitudinal axis of the container opening 7 and/or slot extends in a horizontal direction perpendicular to a direction in which the coater is displaceable across a construction field.

Analogously, the coater output opening 11 may have an elongated slot shape with a longitudinal axis of the coater output opening 11 and/or slot extending in the horizontal direction perpendicular to the direction in which the coater is displaceable. As shown in FIG. 3b), the coater output opening 11 is oriented downward and faces the construction field.

The container opening 9 and the coater output opening 11 may substantially have the same length and/or the same width.

As indicated in FIGS. 3a) to 3c), the container can be pivoted relative to the coater output opening. The pivoting movement is here about its own pivot axis 21. The pivot axis 21 is located within the container 5 and parallel to the longitudinal axis thereof. The coater assembly 1 comprises a (first) pivot drive 19 by which the container 5 is pivotable relative to the coater output opening 11.

The coater assembly 1 may comprise a control unit C that communicates with the (first) pivot drive 19, as shown in FIG. 1.

As shown in FIGS. 3a) to 3c), the output region 9 here comprises two stroking/sweeping members 13a, 13b which are configured to stroke construction material output from the coater output opening 11, to thereby level and/or compress the output particulate material. The two stroking/sweeping members are provided on transversely opposite sides of the coater output opening 11, delimit the coater output opening in a transverse direction on the opposite sides, and enable a so-called bidirectional operation of the coater 3. For example, during the bidirectional operation of the coater 3, only the stroking/sweeping member located at the rear in the direction of travel may substantially be "active". As shown, the container 5 is movable relative to the stroking/sweeping members.

As can be seen, for example, in FIG. 3a), each stroking/sweeping member has a planar stroking/sweeping surface that is directed downwards and/or faces the construction field.

Figure 6:
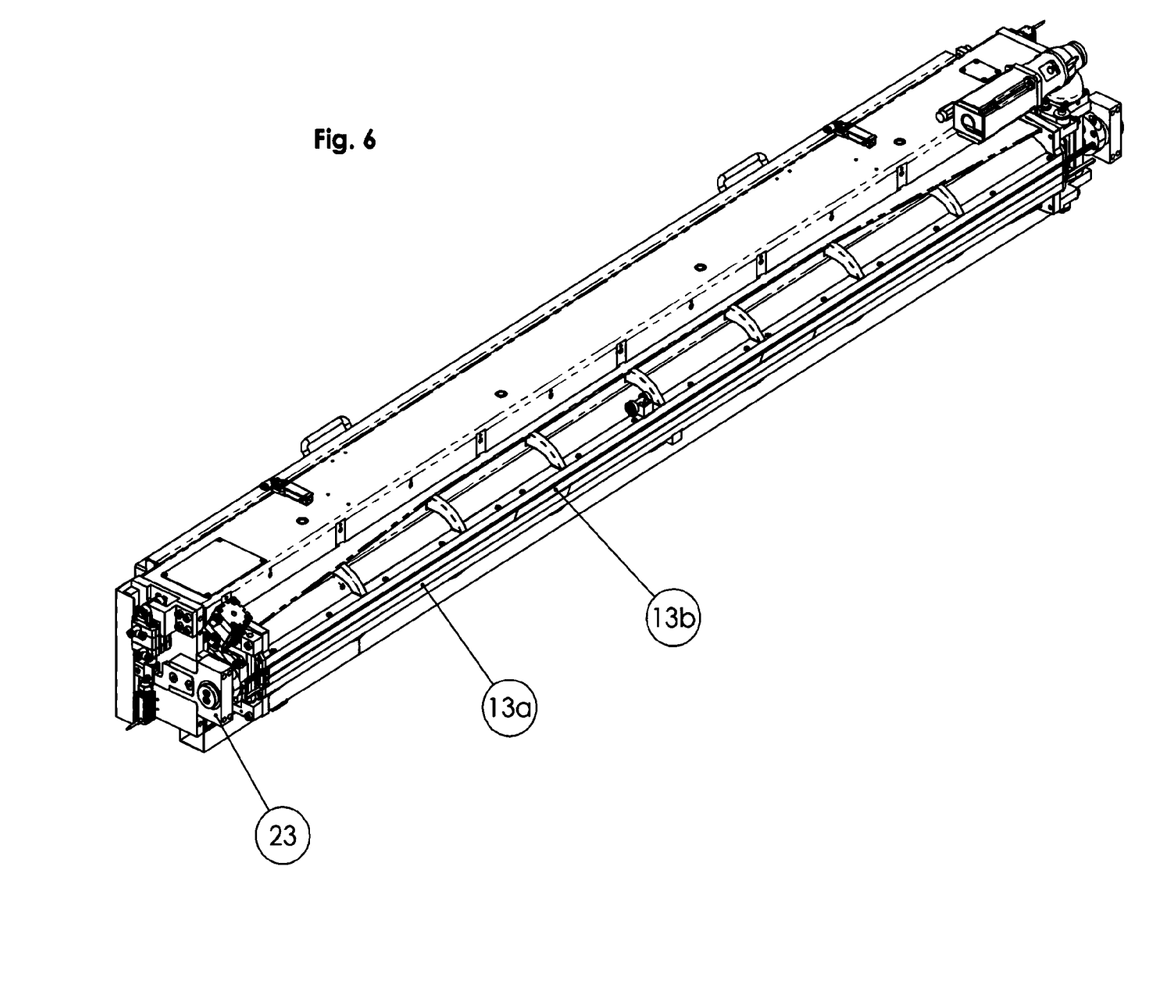
FIG. 6 shows a perspective view of the coater assembly of FIG. 4.

As indicated in FIG. 6 for the second embodiment, the two stroking/sweeping members 13a, 13b may also be elongated and formed to be strip-shaped in the first version. They may, for example, be made of ceramic or metal (for example steel). The respective stroking/sweeping member 13a, 13b may, for example, be designed in the form of a so-called stroking bar/strip and/or stroking blade.

As shown in FIGS. 1, 3a) to 3c), the coater may further comprise a support structure 15 to which the two stroking/sweeping members 13a, 13b are rigidly attached. The support structure 15 is elongated and extends in a horizontal direction which is perpendicular to a direction in which the coater is displaceable. The support structure may, for example, as indicated in the Figures, comprise two parallel carriers extending with their longitudinal axis in the horizontal direction perpendicular to the direction in which the coater is displaceable.

For example, the coater assembly 1 may comprise a vibration drive 17 by which particulate construction material received in the container 5 may be vibrated in order to improve the flow and/or trickle behavior of the particulate construction material. According to the present embodiment, the vibration drive 17 may be provided at a first longitudinal end of the elongated container, and the drive 19 for moving/pivoting the container may be provided at a second longitudinal end of the container. In the present case, the vibration drive 17 excites the pivot axis 21 of the container in an axial direction, in contrast to the state of the art mentioned above, which vibrates a wall section of the container.

The stroking/sweeping members 13a, 13b are attached to the support structure 15 separately from the container 5 and shaking motion-decoupled from the vibration of the construction material in the container 5.

As further illustrated in FIGS. 3a) to 3c), for example, an outer wall 5a of the container 5 may have a downwardly tapering shape in cross-section and/or may have a circular arc shape in cross-section and/or may have a trough shape in cross-section. In addition, the container 5 may be configured to be open in an upward direction and/or may be configured to be elongated, the longitudinal axis extending, for example, in the horizontal direction which is perpendicular to the direction in which the coater is movable.

As shown in FIG. 2, one or more transverse ridges 5b may be provided in the longitudinal direction of the container 5 (here, by way of example, a transverse ridge between the front outer wall portion and the rear outer wall portion of the container 5 in the longitudinal direction). The transverse ridge 5b connects transversely opposite, lateral outer wall sections of the container 5 with each other. This improves a transmission of the vibration to the particulate material.

Figure 4:
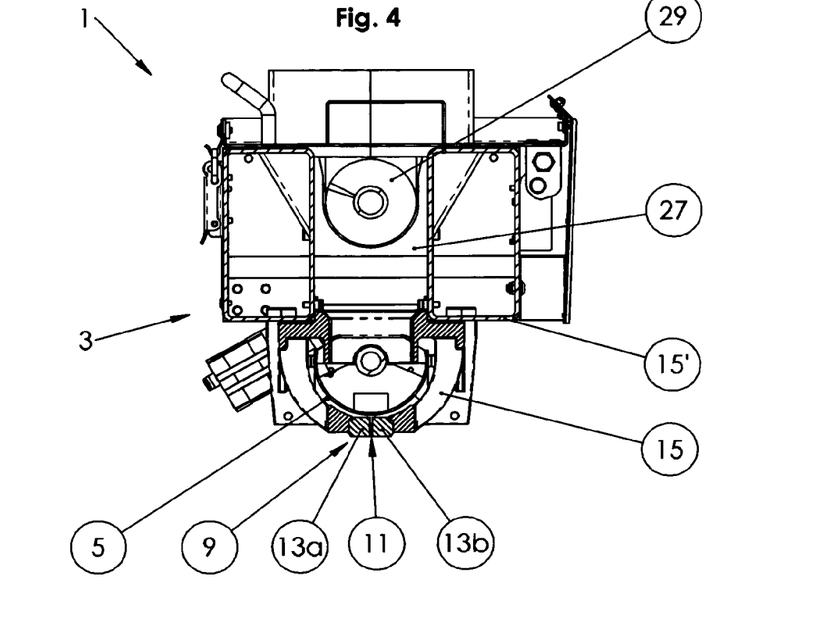
FIG. 4 shows a cross-sectional view of a coater assembly according to a second embodiment of the invention.
Figure 5:
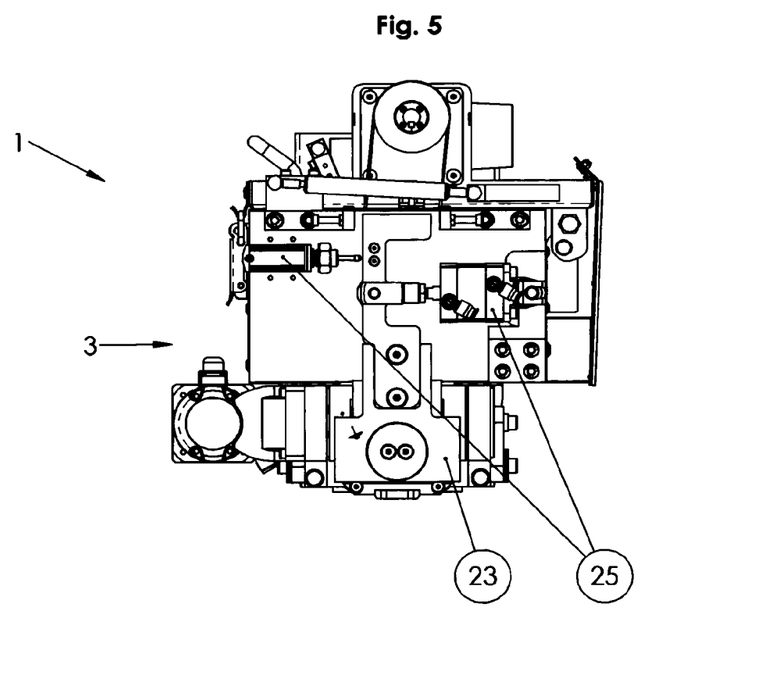
FIG. 5 shows a frontal view of the coater assembly of FIG. 4.

FIGS. 4 to 6 show a coater assembly 1 according to a second embodiment.

The same or similar features as those in the first embodiment are provided with the same reference signs, and no further description of these features shall be provided. Instead, mainly features shall be described which are additionally provided in the second embodiment.

The coater assembly 1 according to the second embodiment comprises a bearing block 23 to which the support structure 15 is pivotably attached, so that the support structure 15 and the stroking/sweeping members 13a, 13b are pivotable relative to the bearing block 23 in order to set an angle of inclination of the stroking/sweeping members, for example an angle between a stroking/sweeping surface of one of the stroking/sweeping members and an imaginary horizontal line or an angle between the stroking/sweeping surface and the construction field. A bearing block may also be provided at each longitudinal end, i.e. altogether two bearing blocks.

The coater assembly 1 may comprise a corresponding (second) pivot drive 25, by which the support structure 15 together with the stroking/sweeping members 13a, 13b can be pivoted relative to the bearing block 23. In this case, the second pivot drive 25 comprises, by way of example, a hydraulic drive attached between the bearing block 23 and the support structure 15, 15', as well as a stopper that is variably adjustable.

According to the second embodiment, the support structure comprises an upper part 15' and a lower part 15, which is designed as shown for the first embodiment and which is rigidly connected to the upper part 15'.

The above-mentioned control unit C can also communicate with the (second) pivot drive 25.

According to these embodiments, the coater 3 and/or the support structure 15, 15' is thus pivotably attached/connected to the bearing block 23 and the container 5 in turn is pivotably attached/connected to the support structure 15, 15'.

In accordance with various embodiments, the coater assembly 1 may also comprise a (not shown) guide structure and a (third) drive not shown, by which the coater 3 is movable across the construction field, for example horizontally and/or linearly. This applies analogously to the first embodiment.

In the second embodiment, for example, the bearing block 23 described above may be attached to the guide structure for this purpose, for example via a (not shown) guide carriage. The control unit can communicate with the (third) drive.

According to the second embodiment, the coater 3 may further comprise a storage container 27, which is configured to feed the container 5 with particulate construction material. In this case, the container 5 is also movable relative to the storage container 27. The storage container 27 is located above the container 5 and is rigidly attached to the support structure 15' and/or formed by the same. A distributor device 29, such as a distributing worm, is received in the storage container 27. The storage container 27 may be configured to be open in an upward direction, so that it can be filled with fresh construction material in a filling station (not shown) of a 3D printer by itself.

The coater assembly according to the first or second embodiment may be used in a 3D printer, for example. A 3D printer of this type may further comprise:

a printing device for selectively outputting a treatment agent in a controlled way (for example a binder jetting device); and/or a feeding unit integrated into the 3D printer, by which construction material can be freshly prepared and fed into the coater, and/or one or more construction platforms and/or construction boxes, which define a respective construction field.

The invention claimed is:

1. A coater assembly (1) for a 3D printer, comprising: a coater (3) including a container (5) which defines an inner cavity for receiving a particulate construction material which opens into a container opening (7) for outputting the particulate construction material from the container (5), and an output region (9) which defines a coater output opening (11) for outputting the particulate construction material from the coater (3) onto a construction field, wherein the container (5) is movable relative to the coater output opening (11), so that, by moving the container (5) relative to the coater output opening (11), a discharge of the particulate construction material from the inner cavity through the container opening (7) and the coater output opening (11) onto the construction field is variable, the coater assembly (1) further comprising a vibration device comprising a vibration drive (17) by which the particulate construction material received in the container can be vibrated, and wherein the container (5) is pivotable relative to the coater output opening (11) about a pivot axis (21), and the vibration drive (17) is configured to excite the pivot axis (21) of the container (5) in an axial direction by reciprocating the pivot axis (21) in an axial direction, wherein the container (5) is elongated, the vibration drive (17) is located at a first longitudinal end of the container, and a drive (19) for moving the container (5) relative to the coater output opening (11) is located at a second longitudinal end of the container (5), and wherein the axial direction is defined along the pivot axis from the first longitudinal end to the second longitudinal end.

2. The coater assembly of claim 1, wherein by moving the container (5) relative to the coater output opening (11), the discharge of the particulate construction material can be dosed.

3. The coater assembly (1) of claim 1, wherein by moving the container (5) relative to the coater output opening (11), the discharge of the particulate construction material can be suppressed.

4. The coater assembly (1) of claim 1, wherein the container (5) is pivotable relative to the coater output opening (11).

5. The coater assembly (1) of claim 1, wherein the output region (9) comprises at least one stroking/sweeping member (13a) configured to stroke construction material output from the coater output opening (11) to thereby level and/or compress the output particulate material, and the container (5) is movable relative to the at least one stroking/sweeping member (13a).

6. The coater assembly (1) of claim 5, wherein the coater (3) further comprises a support structure (15) to which the at least one stroking/sweeping member (13a) is attached.

7. The coater assembly (1) of claim 6, further comprising a bearing block (23) to which the support structure (15) is pivotably attached, so that the support structure (15) and the at least one stroking/sweeping member (13a) attached thereto are pivotable relative to the bearing block (23) to set an angle of the at least one stroking/sweeping member (13a).

8. The coater assembly (1) of claim 6, wherein the container (5) is pivotably attached to the support structure (15).

9. The coater assembly (1) of claim 1, further comprising a guide structure and a drive by which the coater (3) is movable across the construction field.

10. The coater assembly (1) of claim 1, wherein an outer wall (Sa) of the container (5) has a downwardly tapering shape in a cross-section.

11. The coater assembly (1) of claim 1, wherein an outer wall (Sa) of the container (5) has a circular arc shape in a cross-section.

12. The coater assembly (1) of claim 1, wherein an outer wall (Sa) of the container (5) has a trough shape in a cross-section.

13. The coater assembly (1) of claim 1, wherein the container (5) is elongated and the container has one or more transverse ridges (Sb) in its longitudinal direction.

14. The coater assembly (1) of claim 1, wherein the coater (3) further comprises a storage container (27) configured to feed the container (5) with the particulate construction material, and the container (5) is movable relative to the storage container (27).

15. The coater assembly (1) of claim 1, further comprising a control unit (C) configured to move the container (5) relative to the coater output opening (11) by means of a drive (19) to thereby vary the discharge.

16. A 3D printer comprising: a coater assembly having a coater (3), the coater (3) including a container (5) which defines an inner cavity for receiving a particulate construction material which opens into a container opening (7) for outputting the particulate construction material from the container (5), and an output region (9) which defines a coater output opening (11) for outputting the particulate construction material from the coater (3) onto a construction field, wherein the container (5) is movable relative to the coater output opening (11), so that, by moving the container (5) relative to the coater output opening (11), a discharge of the particulate construction material from the inner cavity through the container opening (7) and the coater output opening (11) onto the construction field is variable, the coater assembly (1) further comprising a vibration device comprising a vibration drive (17) by which the particulate construction material received in the container can be vibrated, and wherein the container (5) is pivotable relative to the coater output opening (11) about a pivot axis (21), and the vibration drive (17) is configured to excite the pivot axis (21) of the container (5) in an axial direction by reciprocating the pivot axis (21) in an axial direction, wherein the container (5) is elongated, the vibration drive (17) is located at a first longitudinal end of the container, and a drive (19) for moving the container (5) relative to the coater output opening (11) is located at a second longitudinal end of the container (5), and wherein the axial direction is defined along the pivot axis from the first longitudinal end to the second longitudinal end.

17. A coater assembly (1) for a 3D printer, comprising:
a coater (3) including
    a container (5) which defines an inner cavity for receiving a particulate construction material which opens into a container opening (7) for outputting the particulate construction material from the container (5), and
    an output region (9) which defines a coater output opening (11) for outputting the particulate construction material from the coater (3) onto a construction field,
    wherein the container (5) is movable relative to the coater output opening (11), so that, by moving the container (5) relative to the coater output opening (11), a discharge of the particulate construction, material from the inner cavity through the container opening (7) and the coater output opening (11) onto the construction field is variable,
    wherein the output region (9) comprises at least one stroking/sweeping member (13a) configured to stroke construction material output from the coater output opening (11) to thereby level and/or compress the output particulate material, and the container (5) is movable relative to the at least one stroking/sweeping member (13a),
    wherein the coater (3) further comprises a support structure (15) to which the at least one stroking/sweeping member (13a) is attached,
    wherein the coater assembly (1) further comprises a bearing block (23) to which the support structure (15) is pivotably attached, so that the support structure (15) and the at least one stroking/sweeping member (13a) attached thereto are pivotable relative to the bearing block (23) to set an angle of the at least one stroking/sweeping member (13a), and
    wherein the container (5) is pivotably attached to the support structure (15).

* * * * *